US009553848B2

(12) United States Patent
Rustagi et al.

(10) Patent No.: US 9,553,848 B2
(45) Date of Patent: Jan. 24, 2017

(54) SECURE CONDITIONAL ACCESS AND DIGITAL RIGHTS MANAGEMENT IN A MULTIMEDIA PROCESSOR

(75) Inventors: Viresh Rustagi, Sunnyvale, CA (US); Christopher Wilson, Sunnyvale, CA (US); Christopher Boross, Palo Alto, CA (US)

(73) Assignee: Broadcom Corporation, Irvine, CA (US)

( * ) Notice: Subject to any disclaimer, the term of this patent is extended or adjusted under 35 U.S.C. 154(b) by 3510 days.

(21) Appl. No.: 11/400,157

(22) Filed: Apr. 6, 2006

(65) Prior Publication Data

US 2006/0233149 A1    Oct. 19, 2006

Related U.S. Application Data

(60) Provisional application No. 60/669,223, filed on Apr. 6, 2005, provisional application No. 60/750,438, filed on Dec. 14, 2005.

(51) Int. Cl.
*H04B 7/216* (2006.01)
*H04L 29/06* (2006.01)
(Continued)

(52) U.S. Cl.
CPC .......... *H04L 63/0428* (2013.01); *G06F 21/10* (2013.01); *H04L 63/0853* (2013.01); *H04L 63/10* (2013.01);
(Continued)

(58) Field of Classification Search
CPC ... G06F 21/10; H04L 63/0428; H04L 63/0853
(Continued)

(56) References Cited

U.S. PATENT DOCUMENTS 4,634,807 A * 1/1987 Chorley et al. ................. 705/55
5,457,748 A * 10/1995 Bergum et al. ............... 380/270
(Continued)

FOREIGN PATENT DOCUMENTS

EP    1367843 A1    12/2003
EP    1404085 A1    3/2004
(Continued)

OTHER PUBLICATIONS

Panda et al. "On-chip vs. Off-chip Memory: The Data Partitioning Problem in Embedded Processor-based Systems", ACM Transactions on Design Automation of Electronic Systems, vol. 5, No. 3, Jul. 2000, pp. 682-704, pp. 682=704.*
(Continued)

*Primary Examiner* — Kambiz Zand
*Assistant Examiner* — Tongoc Tran
(74) *Attorney, Agent, or Firm* — Brinks Gilson & Lione (57) ABSTRACT

Methods and systems for processing video data are disclosed herein and may comprise receiving within a single mobile multimedia processor chip integrated within a mobile device, a secure key from an off-chip device integrated within the mobile device. The secure key may be decrypted within the single mobile multimedia processor chip, utilizing an on-chip key. The decrypted secure key may be stored within the single mobile multimedia processor chip. The received encrypted data may be decrypted within the single mobile multimedia processor chip, using the stored, decrypted secure key. The on-chip key may be stored within a one-time programmable (OTP) memory in the single mobile multimedia processor chip. The stored on-chip key may be retrieved from the OTP memory for the decrypting. The stored decrypted received secure key may be encrypted utilizing the on-chip key stored within the single mobile multimedia processor chip.

28 Claims, 10 Drawing Sheets

(51) Int. Cl.
*G06F 21/10* (2013.01)
*H04N 7/167* (2011.01)
*H04N 21/254* (2011.01)
*H04N 21/258* (2011.01)
*H04N 21/414* (2011.01)
*H04N 21/4147* (2011.01)
*H04N 21/418* (2011.01)
*H04N 21/426* (2011.01)
*H04N 21/436* (2011.01)
*H04N 21/4405* (2011.01)
*H04N 21/443* (2011.01)
*H04N 21/81* (2011.01)
*H04N 21/835* (2011.01)

(52) U.S. Cl.
CPC ........ *H04N 7/1675* (2013.01); *H04N 21/2541* (2013.01); *H04N 21/25816* (2013.01); *H04N 21/418* (2013.01); *H04N 21/4147* (2013.01); *H04N 21/41407* (2013.01); *H04N 21/42623* (2013.01); *H04N 21/42692* (2013.01); *H04N 21/436* (2013.01); *H04N 21/443* (2013.01); *H04N 21/4405* (2013.01); *H04N 21/8193* (2013.01); *H04N 21/835* (2013.01); *H04L 2463/101* (2013.01)

(58) Field of Classification Search
USPC .... 380/270, 284, 232, 229, 203, 200; 726/2, 726/4, 10, 26, 27; 713/165
See application file for complete search history.

(56) References Cited

U.S. PATENT DOCUMENTS

| 5,809,144 | A | * | 9/1998 | Sirbu et al. | 705/53 |
| 5,949,881 | A | * | 9/1999 | Davis | 713/189 |
| 6,003,117 | A | * | 12/1999 | Buer et al. | 711/163 |
| 6,101,605 | A | * | 8/2000 | Buer | 713/189 |
| 6,125,185 | A | * | 9/2000 | Boesch | 380/285 |
| 6,260,132 | B1 | * | 7/2001 | Buer | 712/208 |
| 6,282,651 | B1 | * | 8/2001 | Ashe | 713/193 |
| 6,725,375 | B2 | * | 4/2004 | Fujioka | 713/191 |
| 6,795,555 | B1 | * | 9/2004 | Parisien et al. | 380/47 |
| 6,978,152 | B1 | * | 12/2005 | Yamaashi et al. | 455/526 |
| 6,983,366 | B1 | * | 1/2006 | Huynh et al. | 713/168 |
| 7,406,598 | B2 | * | 7/2008 | Ducharme | 713/171 |
| 7,937,595 | B1 | * | 5/2011 | Kumar et al. | 713/192 |
| 2001/0026619 | A1 | * | 10/2001 | Howard et al. | 380/279 |
| 2002/0048371 | A1 | * | 4/2002 | Iwamura | 380/278 |
| 2002/0184512 | A1 | * | 12/2002 | Cardoso, Jr. | 713/193 |
| 2003/0026432 | A1 | * | 2/2003 | Woodward | 380/278 |
| 2004/0005061 | A1 | * | 1/2004 | Buer et al. | 380/282 |
| 2004/0247128 | A1 | * | 12/2004 | Patariu et al. | 380/277 |
| 2005/0086479 | A1 | * | 4/2005 | Ondet et al. | 713/172 |
| 2005/0268092 | A1 | * | 12/2005 | Shankar et al. | 713/164 |

FOREIGN PATENT DOCUMENTS

EP 1406446 A1 4/2004
WO WO 02076127 9/2002

OTHER PUBLICATIONS http://www.trusted-logic.com/spip.php?article165, Oct. 2009.*
SVP: "SVP Open Content Protection System Technical Overview" SVP Open Content Protection System, (online) Jan. 3, 2005; XP002393003; Retrieved from Internet: URL: http://www.svpalliance.org; the whole document.

* cited by examiner

SECURE CONDITIONAL ACCESS AND DIGITAL RIGHTS MANAGEMENT IN A MULTIMEDIA PROCESSOR

CROSS-REFERENCE TO RELATED APPLICATIONS/INCORPORATION BY REFERENCE

This application makes reference, claims priority to, and claims the benefit of U.S. Provisional Application Ser. No. 60/669,223 filed Apr. 6, 2005, which is hereby incorporated herein by reference in its entirety.

This application makes reference, claims priority to, and claims the benefit of U.S. Provisional Application Ser. No. 60/750,438 filed Dec. 14, 2005, which is hereby incorporated herein by reference in its entirety.

FIELD OF THE INVENTION

Certain embodiments of the invention relate to mobile multimedia communication. More specifically, certain embodiments of the invention relate to secure conditional access and digital rights management in a multimedia processor.

BACKGROUND OF THE INVENTION

Mobile communications have changed the way people communicate and mobile phones have been transformed from a luxury item to an essential part of every day life. The use of mobile phones today is dictated by social situations, rather than hampered by location or technology. While voice connections fulfill the basic need to communicate, and mobile voice connections continue to filter even further into the fabric of every day life, various integrated mobile multimedia applications, utilizing the mobile Internet, are the next step in the mobile communication revolution.

Third generation (3G) cellular networks offering various high speed access technologies and mobile telephones that have been specifically designed to utilize these technologies, fulfill demands for integrated multimedia applications supporting TV and audio applications utilizing advanced compression standards, high-resolution gaming applications, musical interfaces, peripheral interface support, etc. The processing requirements are being increased as chip designers take advantage of compression and higher bandwidths to transmit more information. 3G wireless applications support bit rates from 384 kilobits (Kbits)/second to 2 megabits (Mbits)/second, allowing chip designers to provide wireless systems with multimedia capabilities, superior quality, reduced interference, and a wider coverage area.

As mobile multimedia services grow in popularity and usage, factors such as power consumption, cost efficient optimization of network capacity and quality of service (QoS) are becoming even more essential to cellular operators than they are today. These factors may be achieved with careful network planning and operation, improvements in transmission methods, and advances in receiver techniques and chip integration solutions. To this end, carriers need technologies that will allow them to increase downlink throughput for the mobile multimedia applications support and, in turn, offer advanced QoS capabilities and speeds for consumers of mobile multimedia application services. Currently, mobile multimedia processors don't fully exploit system-on-a-chip (SOC) integration for advanced total system solution for today's mobile handsets.

For example, conventional mobile processors may utilize a plurality of hardware accelerators to enable a variety of multimedia applications, which significantly increases power consumption, implementation complexity, mobile processor real estate, and ultimately terminal size. In addition, conventional mobile multimedia processors do not provide a secure platform for conditional access and digital rights management. Multimedia content is decrypted outside the mobile multimedia processor and is exposed to potential hackers when the decrypted content is communicated to the mobile multimedia processor for processing.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for secure conditional access and digital rights management in a multimedia processor, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for secure conditional access and digital rights management in a single mobile multimedia processor chip. In one embodiment of the invention, multimedia content may be decrypted within the single mobile multimedia processor chip, utilizing one or more secure keys. The secure keys utilized during decryption of encrypted multimedia content may be communicated in encrypted state to the single mobile multimedia processor chip and may be decrypted on-chip utilizing an on-chip key.

In accordance with other aspects of the invention, digital rights management (DRM) functionalities within the single mobile multimedia processor chip may be implemented via a secure kernel that may run in an encrypted mode. For example, a secure key may be received within the single mobile multimedia processor chip, from an off-chip device. An on-chip key may be utilized for decryption of the secure key within the single mobile multimedia processor chip. The decrypted, received secure key may then be stored within the single mobile multimedia processor chip. The received, encrypted data may be decrypted within the single mobile multimedia processor chip, using the stored, decrypted and received secure key. The on-chip key may be stored within a one-time programmable (OTP) memory in the single mobile multimedia processor chip. The stored on-chip key may be retrieved from the OTP memory for the decrypting. The stored, decrypted and received secure key may be encrypted utilizing the on-chip key stored within the single mobile multimedia processor chip.

Figure 1A:
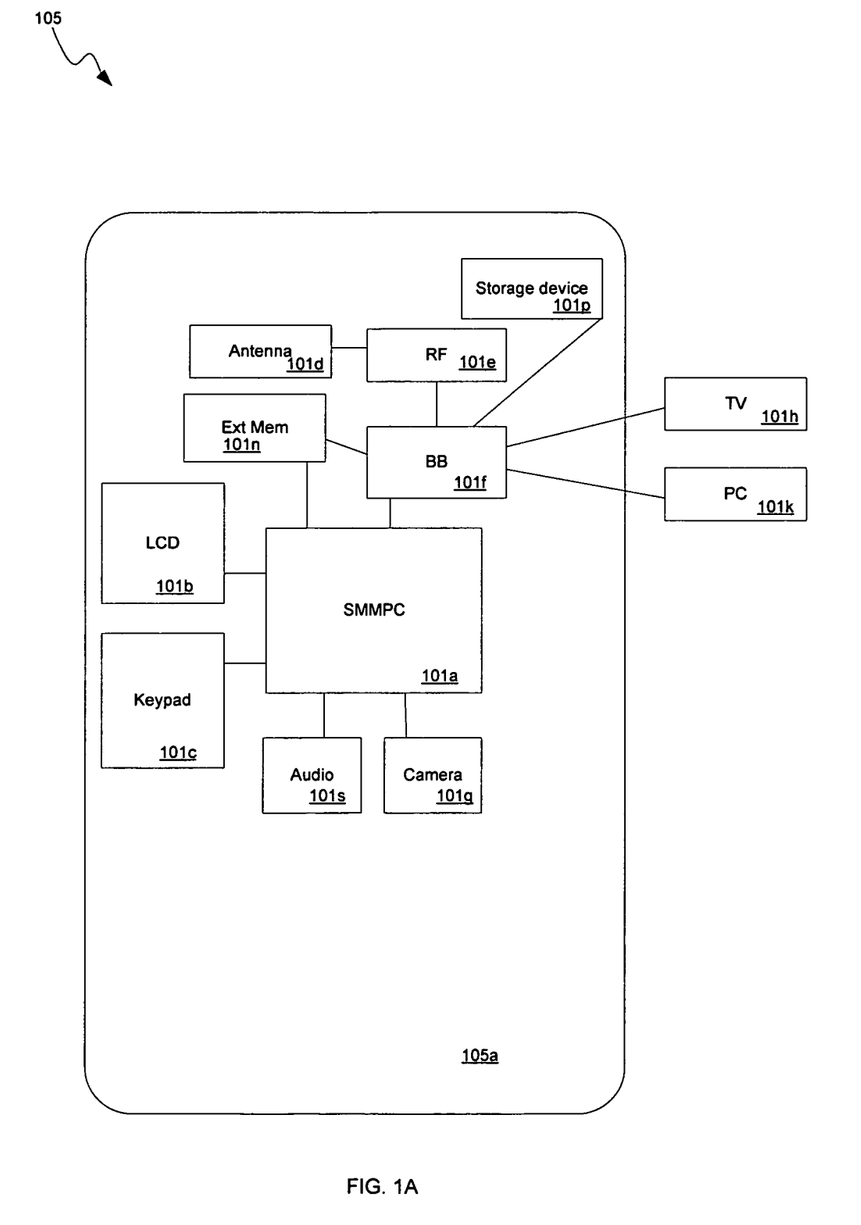
FIG. 1A is a block diagram of an exemplary mobile multimedia system, in accordance with an embodiment of the invention.

FIG. 1A is a block diagram of an exemplary mobile multimedia system, in accordance with an embodiment of the invention. Referring to FIG. 1A, there is shown a mobile multimedia system 105 that comprises a mobile multimedia device 105a, a TV 101h, and a PC 101k. The mobile multimedia device 105a may be a cellular telephone or other handheld communication device. The mobile multimedia device 105a may comprise a single mobile multimedia processor chip (SMMPC) 101a, an antenna 101d, an audio block 101s, a storage device 101p, an external memory 101n, a radio frequency (RF) block 101e, a baseband processing block 101f, an LCD display 101b, a keypad 101c, and a camera 101g.

The SMMPC 101a may comprise suitable circuitry, logic, and/or code and may be adapted to perform video and/or multimedia processing for the mobile multimedia device 105a. The SMMPC 101a may further comprise a plurality of integrated interfaces, which may be utilized to support one or more external devices coupled to the mobile multimedia device 105a. For example, the SMMPC 101a may support connections to a TV 101h and/or to a PC 101k.

In operation, the mobile multimedia device may receive signals via the antenna 101d. Received signals may be processed by the RF block 101e and the RF signals may be converted to baseband by the baseband processing block 101f. Baseband signals may then be processed by the SMMPC 101a. Audio and/or video signals may also be received via the integrated camera 101g and/or the PC 101k. During processing, the SMMPC 101a may utilize the external memory 101n for storing of processed data. Processed audio data may be communicated to the audio block 101s and processed video data may be communicated to the LCD 101b or the TV 101h, for example. The keypad 101c may be utilized for communicating processing commands and/or other data, which may be required for audio or video data processing by the SMMPC 101a.

In one embodiment of the invention, the SMMPC 101a may be adapted to receive a secure key from an off-chip device. An on-chip key stored within the SMMPC 101a may be utilized for decryption of the received secure key. The decrypted and received secure key may then be stored within the SMMPC 101a. Furthermore, encrypted multimedia content may be received by the mobile multimedia device 105a via the antenna 101d. The received, encrypted multimedia content may be decrypted within the SMMPC 101a using the stored decrypted received secure key. The on-chip key may be stored within a one-time programmable (OTP) memory in the SMMPC 101a. The stored on-chip key may be retrieved from the OTP memory for the decrypting of the secure key. The stored, decrypted and received secure key may be encrypted utilizing the on-chip key stored within the SMMPC 101a.

Figure 1B:
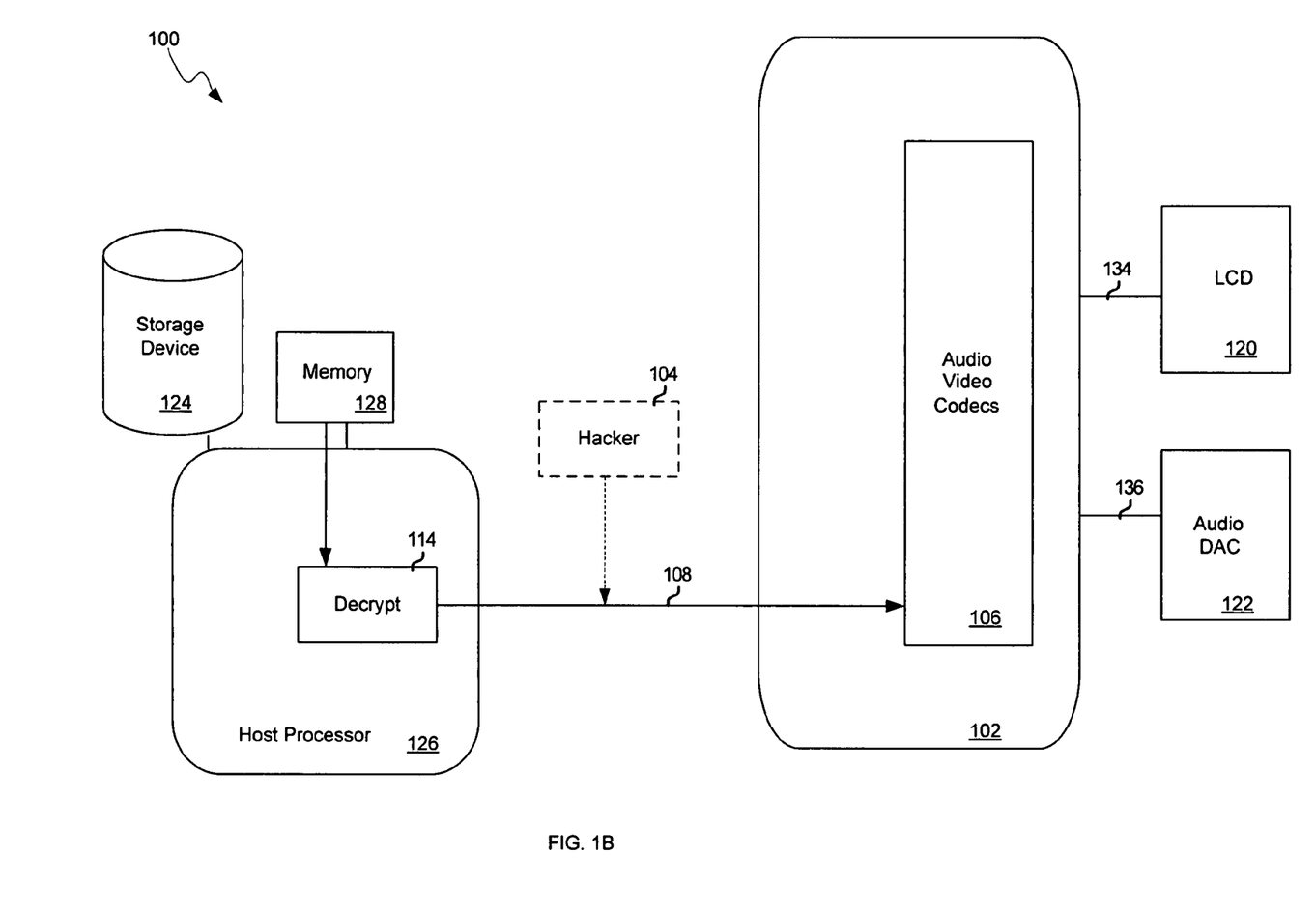
FIG. 1B is a block diagram of an exemplary mobile multimedia system, which may be utilized in accordance with an embodiment of the invention.

FIG. 1B is a block diagram of an exemplary mobile multimedia system, which may be utilized in accordance with an embodiment of the invention. Referring to FIG. 1B, the exemplary mobile multimedia system 100 may comprise a storage device, such as a hard disk drive, 124, an external memory 128, a host processor 126, a single mobile multimedia processor chip 102, a display 120, and an audio digital-to-analog converter (DAC) 122. The host processor 126 may comprise a decryption block 114, and the single mobile multimedia processor chip 102 may comprise an audio/video coder/decoder (A/V CODEC) block 106.

The host processor 126 may comprise suitable circuitry, logic, and/or code and may be adapted to handle application level processing of information for the mobile multimedia system 100. The single mobile multimedia processor chip 102 may comprise suitable circuitry, logic, and/or code and may be adapted to handle processing of multimedia content, such as decryption and/or decoding of encrypted and/or encoded multimedia content. For example, the decryption block 114 within the host processor 126 may comprise suitable circuitry, logic, and/or code and may be adapted to decrypt encrypted multimedia content. The A/V CODEC block 106 may comprise suitable circuitry, logic, and/or code and may be adapted to decode encoded multimedia content received from, for example, the host processor 126.

In operation, the storage device 124 and the memory 128 may be adapted to store encrypted multimedia content, such as audio content and/or video content received by the exemplary mobile multimedia system 100. In one embodiment of the invention, the host processor 126 may be adapted to pre-process multimedia content and communicate the pre-processed multimedia content to the single mobile multimedia processor chip 102 for further processing, such as decoding. For example, encrypted multimedia content may be stored within the external memory 128. The encrypted content may then be communicated to the host processor 126, and the decryption block 114 may decrypt the encrypted multimedia content received by the host processor 126. The decrypted content 108 may be communicated to the single mobile multimedia processor chip 102 for further processing. The A/V CODEC 106 may decode the decrypted multimedia content 108, generating a decoded video stream 134 and a decoded audio stream 136. The decoded video stream may be communicated to the display 120 for displaying. The display 120 may comprise an LCD display, for example. The decoded audio stream may be communicated to the audio DAC 122 for conversion to an analog format. The analog audio signal may then be communicated to a speaker.

During communication of the decrypted multimedia content 108 from the host processor to the single mobile multimedia processor chip 102, the decrypted multimedia content 108 may be acquired by, and/or compromised by, a hacker 104 having access to, for example, bus over which the multimedia content 108 is communicated. In one embodiment of the invention, in order to increase security during processing of multimedia content within the exemplary mobile multimedia system 100, multimedia content decryption functions may be transferred from the host processor 126 to the single mobile multimedia processor chip 102. In this regard, decrypted content exposure may be minimized as only encrypted information may be exposed to a potential hacker 104 when content is communicated from the host processor 126 to the single mobile multimedia processor chip 102. To further increase security during processing of multimedia content, the single mobile multimedia processor chip 102 may utilize a secure kernel implementing the multimedia content and secure key decryption functions as well as secure key storage functions.

Figure 2:
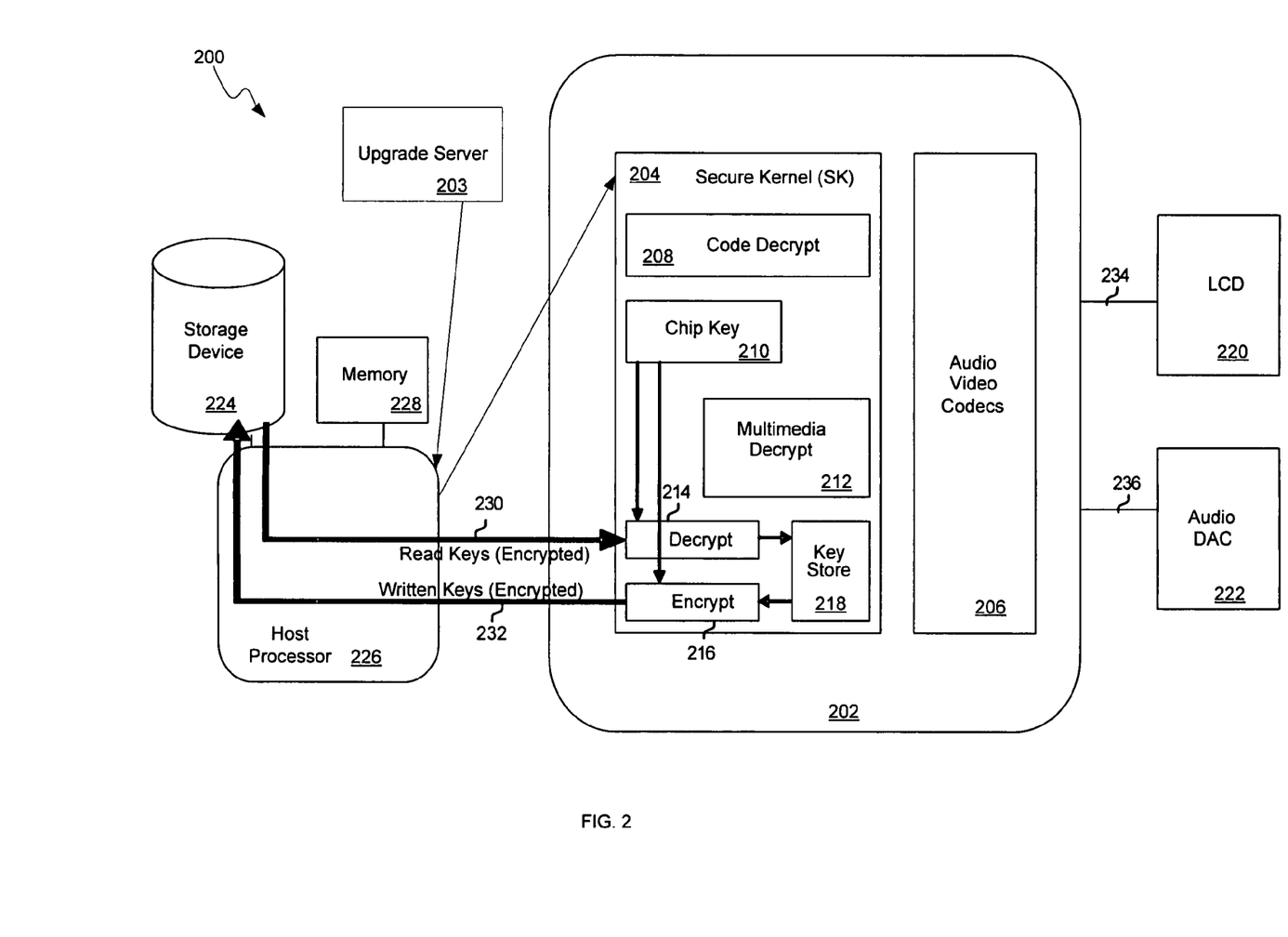
FIG. 2 is a block diagram of an exemplary mobile multimedia system utilizing on-chip secure key encryption and decryption, in accordance with an embodiment of the invention.

FIG. 2 is a block diagram of an exemplary mobile multimedia system utilizing on-chip secure key encryption and decryption, in accordance with an embodiment of the invention. Referring to FIG. 2, the exemplary mobile multimedia system 200 may comprise a storage device 224, such as a hard disk drive, an external memory 228, a host processor 226, a single mobile multimedia processor chip 202, a display 220, and an audio digital-to-analog converter (DAC) 222. The mobile multimedia system 200 may communicate with an upgrade server 203 via the host processor 226. The single mobile multimedia processor chip 202 may comprise a secure kernel (SK) block 204 and an audio/video coder/decoder (A/V CODEC) block 206. The SK block 204 may comprise a code decryption block 208, a chip key storage block 210, a multimedia decryption block 212, a key decryption block 214, a key encryption block 216, and a key storage block 218.

The SK block 204 may comprise suitable circuitry, logic, and/or code and may be adapted to implement multimedia content decryption functionalities in a secure environment. The SK block 204 may also be isolated by a separate boundary within the single mobile multimedia processor chip 202. In this regard, by isolating the SK block 204 within the single mobile multimedia processor chip 202, access to the SK block 204 may be limited and easily monitored, thereby increasing chip security. In one embodiment of the invention, the SK block 204 may be implemented via code that may be executed in an encrypted mode. In this regard, other code, such as code related to multimedia content decoding within the A/V CODEC block 206, may be executed separately from the SK block 204, in an unencrypted mode. The secure kernel 204 may be also adapted to generate encrypted code fragments or segments, which may be used to communicate encrypted secure keys outside the single mobile multimedia processor chip 202.

The code decryption block 208 may comprise suitable circuitry, logic, and/or code and may be adapted to decrypt operation code which may be utilized for implementing the SK block 204 multimedia content decryption functionalities. The chip key storage block 210 may comprise suitable circuitry, logic, and/or code and may be adapted to store a chip key. The chip key may be utilized by the SK block 204 during decryption and encryption of secure keys for multimedia content decryption. The chip key stored in the chip key storage block 210 may also be utilized during decryption of operation code by the code decryption block 208. In one embodiment of the invention, the chip key storage block may comprise a one-time programmable (OTP) memory for storing the chip key and/or additional identifying information unique to the single mobile multimedia processor chip 202. A more detailed description of an embodiment of OTP memory is described with respect to FIG. 8.

The multimedia decryption block 212 may comprise suitable circuitry, logic, and/or code and may be adapted to decrypt encrypted multimedia content received by the single mobile multimedia processor chip 202. The key decryption block 214 may comprise suitable circuitry, logic, and/or code and may be adapted to decrypt encrypted secure keys received by the single mobile multimedia processor chip 202. Decrypted secure keys may be stored within the key storage block 218 and may be utilized during decryption of encrypted multimedia content by the multimedia decryption block 212. The key encryption block 216 may comprise suitable circuitry, logic, and/or code and may be adapted to encrypt decrypted keys stored within the key storage block 218. Secure keys encrypted by the key encryption block 216 may be communicated outside the single mobile multimedia processor chip 202 for storage by an off-chip memory, for example. The off-chip memory may comprise an off-chip disk, for example.

The A/V CODEC block 206 may comprise suitable circuitry, logic, and/or code and may be adapted to decode encoded multimedia content received from, for example, the host processor 226. The host processor 226 may comprise suitable circuitry, logic, and/or code and may be adapted to exchange encrypted secure keys between off-chip storage device, such as the storage device 224 and/or the external memory 228, and the single mobile multimedia processor chip 202. In one embodiment of the invention, the exemplary mobile multimedia system 200 may utilize an upgrade server 203, for securely upgrading code utilized by the SK block 204 via the host processor 226, such as operation and/or application code, for implementing multimedia content decryption functionalities. Code communicated from the upgrade server 203 to the SK block 204 via the host processor 226 may be digitally signed for safety and to ensure authenticity of the communicated information. In this regard, the upgrade server 203 may utilize public key encryption (PKE) to digitally sign code that is communicated to the SK block 204.

In operation, encrypted secure keys may be stored by the storage device 224 and/or within the external memory 228, and may be communicated to the single mobile multimedia processor chip 202 for further processing and use during multimedia content decryption. For example, encrypted secure keys 230 may be communicated from the storage device 224 to the host processor 226, and from the host processor 226 to the key decryption block 214 within the single mobile multimedia processor chip 202

The key decryption block 214 may receive and decrypt the encrypted keys 230 read from the storage device 224. In one embodiment of the invention, the key decryption block 214 may utilize the chip key stored within the chip key storage block 210 during decryption of the encrypted secure keys 230. The decrypted secure keys may be stored within the key storage block 218 and may be utilized during decryption of encrypted multimedia content by the multimedia decryption block 212. Decrypted secure keys that are no longer used for multimedia content decryption may be encrypted by the key encryption block 216. The key encryption block 216 may also utilize the chip key stored in the chip key storage block 210 during encryption of decrypted secure keys stored in the key storage block 218. Encrypted secure keys 232 may be communicated from the key encryption block 216 to the host processor 226 and from the host processor 226 to the storage device 224 for storage.

Decrypted multimedia content may be communicated from the SK block 204 to the A/V CODEC block 206 for decoding. The A/V CODEC block 206 may decode decrypted multimedia content received from the SK block 204, generating a decoded video stream 234 and a decoded audio stream 236. The decoded video stream 234 may be communicated to the display 220 for displaying. The display 220 may comprise an LCD display, for example. The decoded audio stream 236 may be communicated to the audio DAC 222 for conversion to an analog format. The analog audio signal may then be communicated to a speaker.

Figure 3:
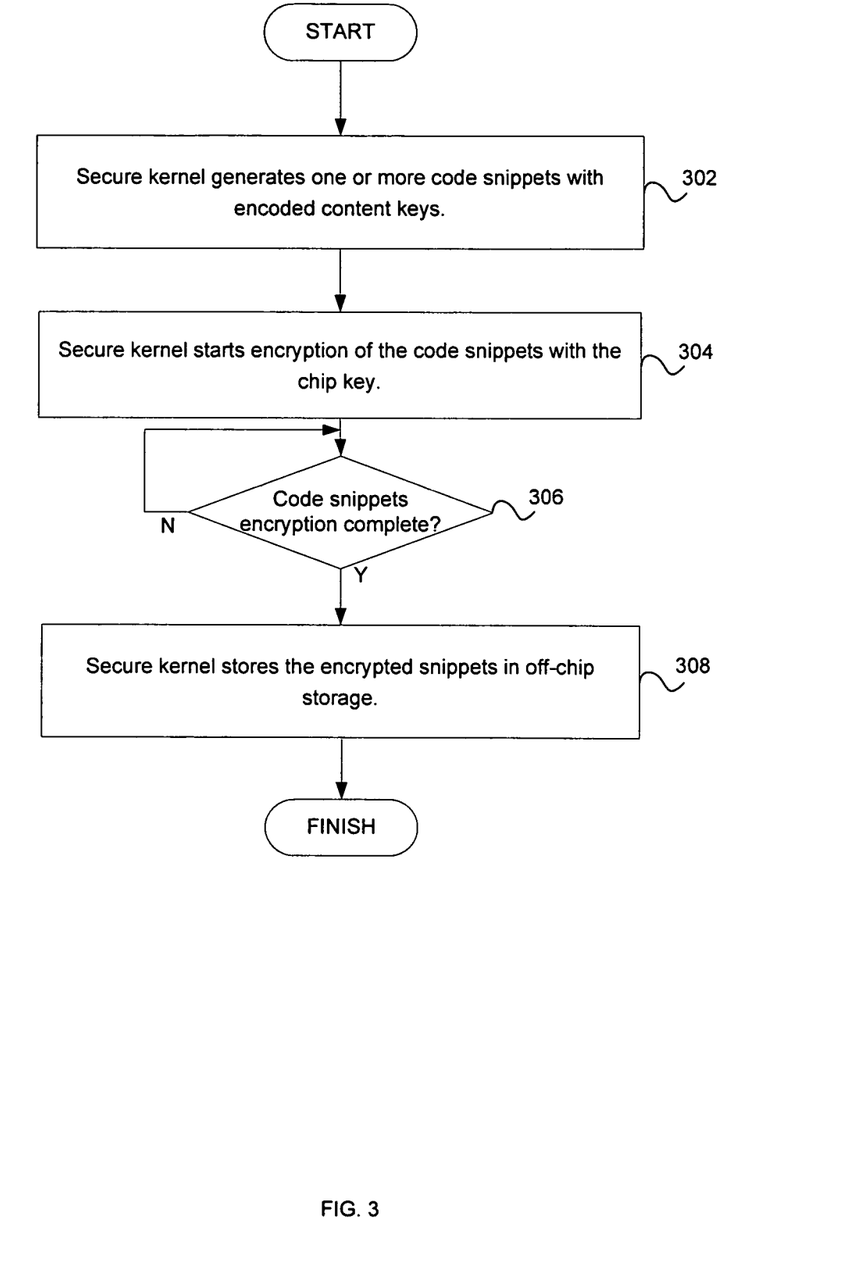
FIG. 3 is a flow diagram illustrating exemplary steps for secure key storage, in accordance with an embodiment of the invention.

FIG. 3 is a flow diagram illustrating exemplary steps for secure key storage, in accordance with an embodiment of the invention. Referring to FIGS. 2 and 3, at 302, the SK block 204 may generate one or more code snippets with encoded secure content keys. At 304, the SK block 204 may start the encryption of the code snippets with the chip key. For example, the key encryption block 216 may encrypt code snippets comprising encoded secure keys with the chip key stored within the chip key storage block 210. At 306, it may be determined whether the code snippets encryption is complete. If the code snippets encryption is complete, at 308, the secure kernel may store the encrypted snippets in off-chip storage. For example, encrypted snippets may be stored in the storage device 224.

Since secure keys 232 have been encrypted with the chip key, which is unique to the single mobile multimedia processor chip 202, the encrypted secure keys 232 may not be compromised without knowing the chip key stored within the chip key storage block 218. In this regard, the single mobile multimedia processor chip 202 may be the single device adapted to utilize the secure keys encrypted with the chip key stored within the chip key storage block 210.

Figure 4:
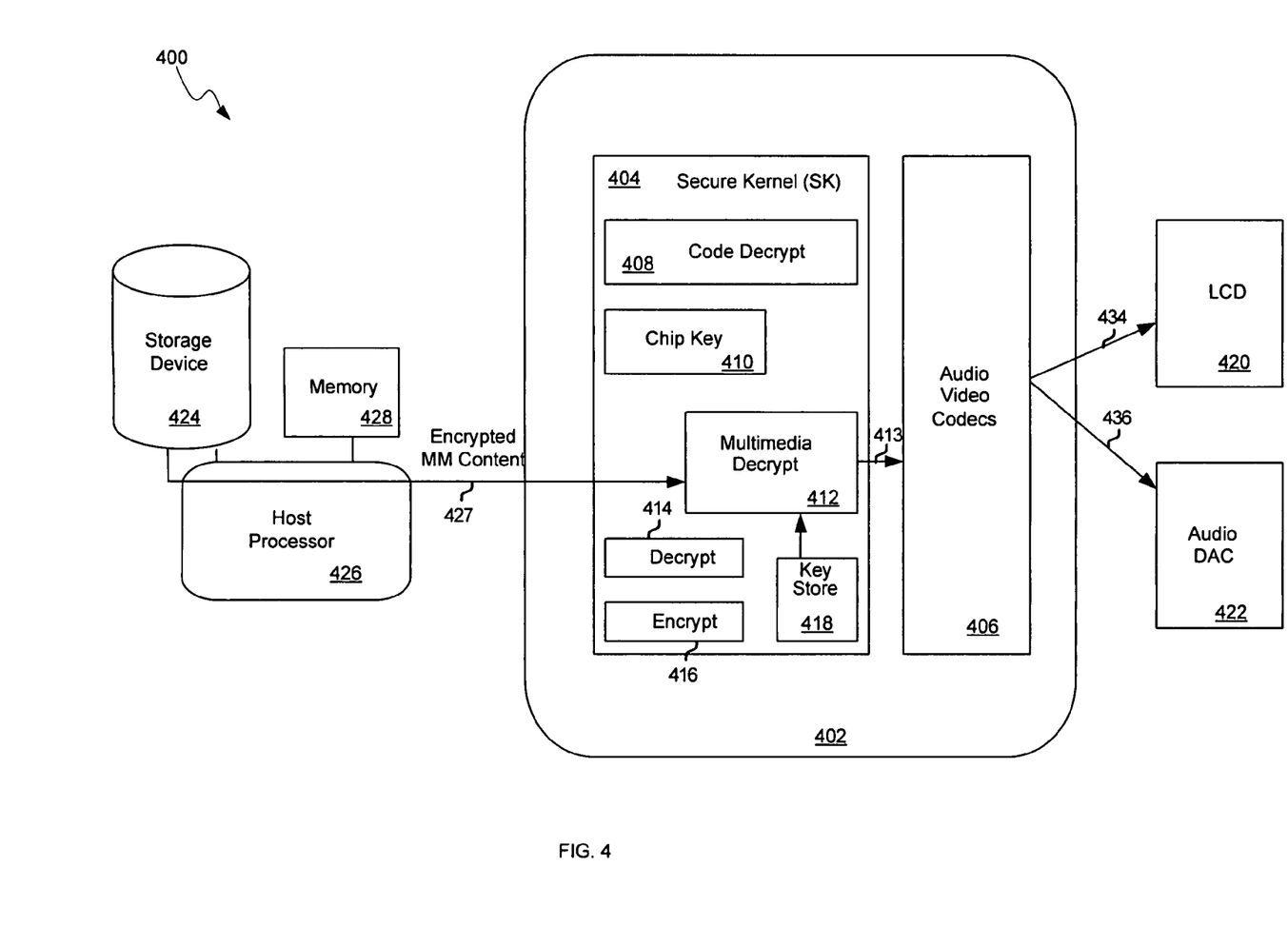
FIG. 4 is a block diagram of an exemplary mobile multimedia system performing on-chip content decryption, in accordance with an embodiment of the invention.

FIG. 4 is a block diagram of an exemplary mobile multimedia system performing on-chip content decryption, in accordance with an embodiment of the invention. Referring to FIG. 4, the exemplary mobile multimedia system 400 may comprise a storage device 424 such as a hard disk drive (HDD), an external memory 428, a host processor 426, a single mobile multimedia processor chip 402, a display 420, and an audio digital-to-analog converter (DAC) 422. The single mobile multimedia processor chip 402 may comprise a secure kernel (SK) block 404 and an audio/video coder/decoder (A/V CODEC) block 406. The SK block 404 may comprise a code decryption block 408, a chip key storage block 410, a multimedia decryption block 412, a key decryption block 414, a key encryption block 416, and a key storage block 418. The storage device 424, the external memory 428, the host processor 426, the display 420, the audio digital-to-analog converter (DAC) 422 and the single mobile multimedia processor chip 402 may be functionally equivalent to corresponding blocks within the exemplary mobile multimedia system 200 of FIG. 2.

In operation, encrypted multimedia content 427 may be communicated from external storage, such as the storage device 424, to the host processor 426. The host processor 426 may communicate the encrypted multimedia content 427 to the single mobile multimedia processor chip 402 for decryption and further processing. For example, the multimedia decryption block 412 may receive the encrypted multimedia content 427. The multimedia decryption block may also receive one or more decrypted secure keys from the key storage block 418. The multimedia decryption block may then decrypt the encrypted multimedia content 427 utilizing the decrypted secure keys received from the key storage block 418.

Decrypted multimedia content 413 may be communicated from the multimedia decryption block 412 to the A/V CODEC block 406 for decoding. The A/V CODEC block 406 may decode decrypted multimedia content 413 received from the multimedia decryption block 412, generating a decoded video stream 434 and a decoded audio stream 436. The decoded video stream 434 may be communicated to the display 420 for displaying. The display 420 may comprise an LCD display, for example. The decoded audio stream 436 may be communicated to the audio DAC 422 for conversion to an analog format. The analog audio signal may then be communicated to a speaker.

Even though the A/V CODEC block 406 is outside the SK block 404 and decoding of decrypted multimedia content 413 is achieved in an unencrypted environment within the single mobile multimedia processor chip 402, the present invention may not be so limited. In one embodiment of the invention, multimedia content processing functionalities, such as decoding, may be performed within the secure kernel block 404.

Figure 5:
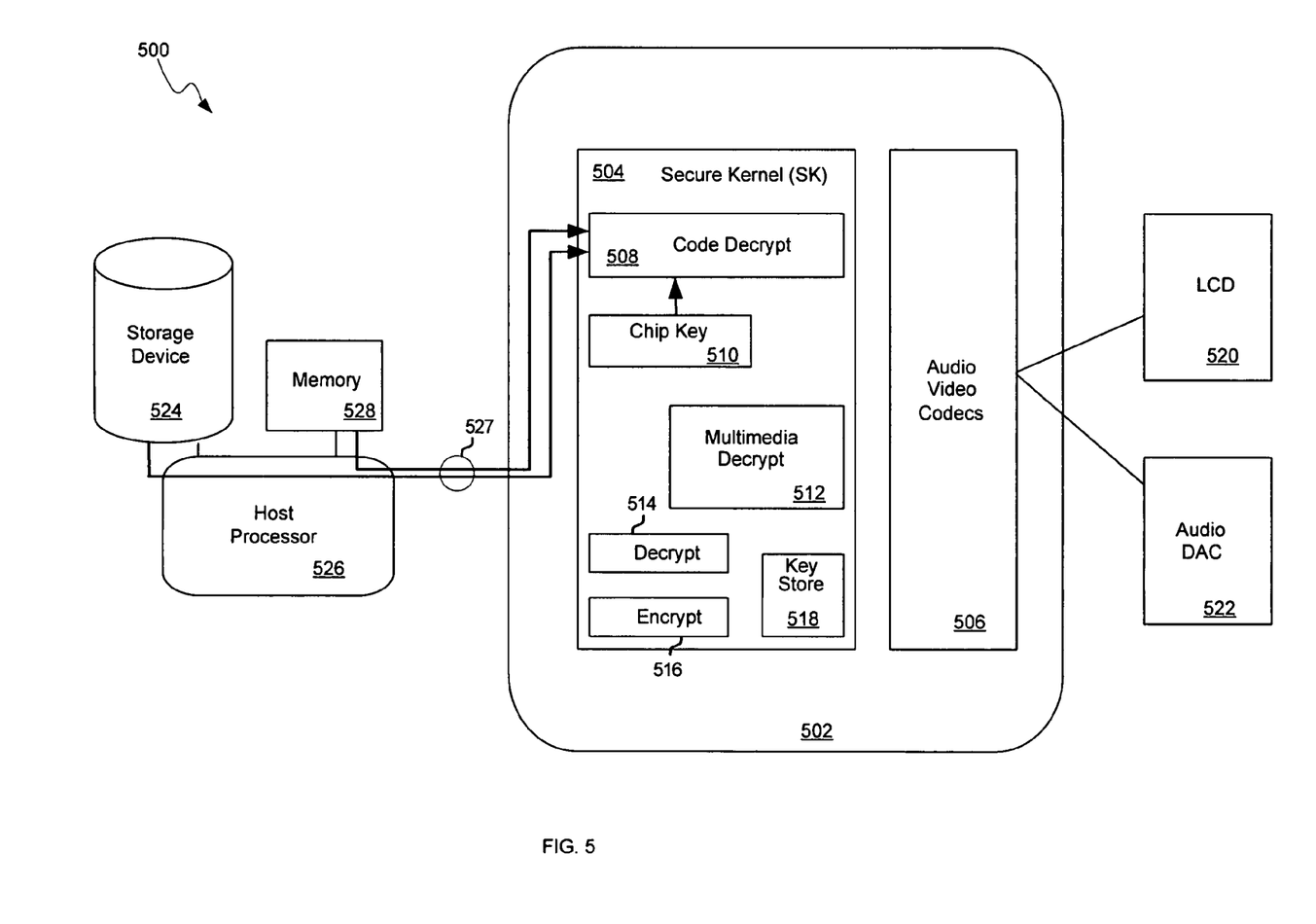
FIG. 5 is a block diagram of an exemplary mobile multimedia system performing on-chip digital rights management (DRM) software code decryption, in accordance with an embodiment of the invention.

FIG. 5 is a block diagram of an exemplary mobile multimedia system performing on-chip digital rights management (DRM) software code decryption, in accordance with an embodiment of the invention. Referring to FIG. 5, the exemplary mobile multimedia system 500 may comprise a storage device 524 such as a hard disk drive, an external memory 528, a host processor 526, a single mobile multimedia processor chip 502, a display 520, and an audio digital-to-analog converter (DAC) 522. The single mobile multimedia processor chip 502 may comprise a secure kernel (SK) block 504 and an audio/video coder/decoder (A/V CODEC) block 506. The SK block 504 may comprise a code decryption block 508, a chip key storage block 510, a multimedia decryption block 512, a key decryption block 514, a key encryption block 516, and a key storage block 518. The storage device 524, the external memory 528, the host processor 526, the display 520, the audio digital-to-analog converter (DAC) 522, and the single mobile multimedia processor chip 502 may be functionally equivalent to corresponding blocks within the exemplary mobile multimedia system 200 of FIG. 2.

The code decryption block 508 may comprise suitable circuitry, logic, and/or code and may be adapted to decrypt operation code which may be utilized for implementing the SK block 504 multimedia content decryption functionalities. In operation, encrypted operation code 527 may be communicated from the external memory 528 and/or from the storage device 524 to the host processor 526. In an exemplary aspect of the invention, the encrypted operation code 527 may comprise application level code which may be used by one or more blocks within the single mobile multimedia processor chip 502. For example, the encrypted operation code 527 may comprise digital rights management (DRM) operation code. The encrypted operation code 527 may then be communicated from the host processor 526 to the code decryption block 508 within the SK block 504. The code decryption block 508 may utilize the chip key stored within the chip key storage block 510 to decrypt the encrypted operation code received by the code decryption block 508.

Figure 6:
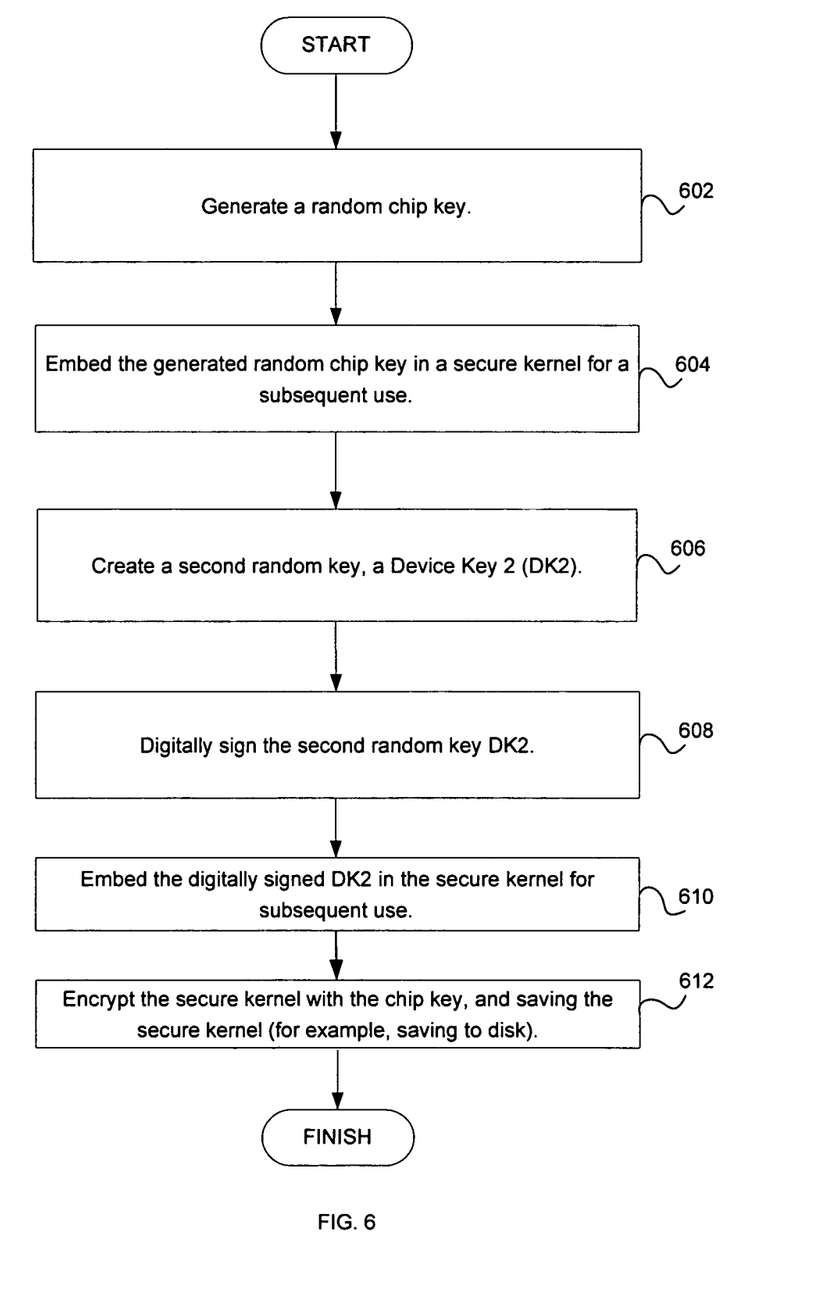
FIG. 6 is a flow diagram illustrating exemplary steps for mobile multimedia processor initialization, in accordance with an embodiment of the invention.

FIG. 6 is a flow diagram illustrating exemplary steps for mobile multimedia processor initialization, in accordance with an embodiment of the invention. Referring to FIGS. 2 and 6, at 602, a random chip key may be generated, which is unique to the single mobile multimedia processor chip 202. The random chip key may be generated at the time the single mobile multimedia processor chip 202 is manufactured. At 604, the generated random chip key may be embedded in the secure kernel 204 for subsequent use. At 606, a second random key, a Device Key 2 (DK2), may be also created at the time the single mobile multimedia processor chip 202 is manufactured. At 608, the second random key DK2 may be digitally signed at the time the single mobile multimedia processor chip 202 is manufactured. For example, the DK2 may be digitally signed by the chip manufacturer with a private key and the private key may be known only to the manufacturer. At 610, the digitally signed DK2 may be embedded in the secure kernel 204 for subsequent use. For example, the digitally signed DK2 may be utilized by the single mobile multimedia processor chip 202 to authenticate itself before off-chip devices, such as a central server, for example. At 612, the secure kernel 204 may be encrypted with the generated random chip key. In this regard, the single mobile multimedia processor chip 202 obtains a device-specific certificate to authenticate itself and a device-specific version of a secure kernel, without the ability for creation of additional certificates.

Figure 7:
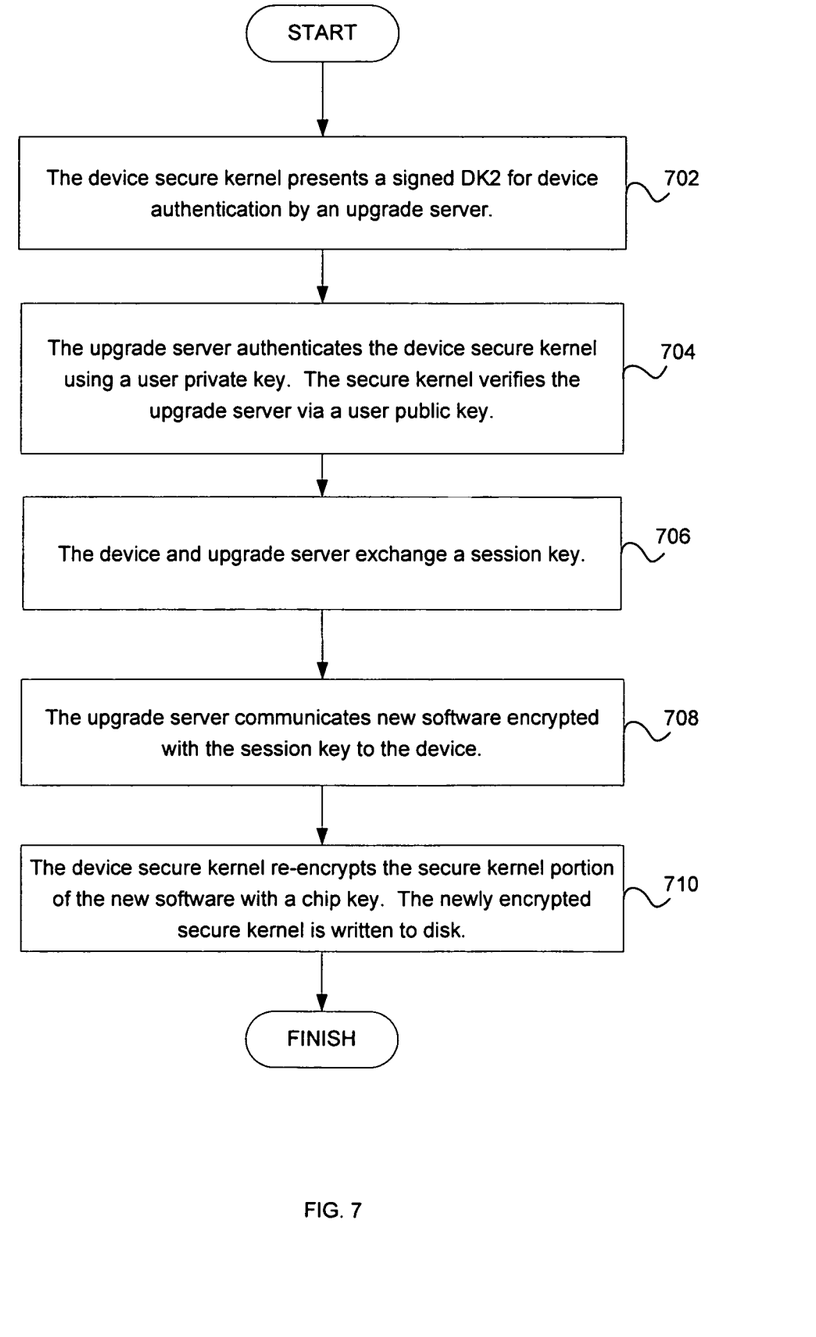
FIG. 7 is a flow diagram illustrating exemplary steps for mobile multimedia processor secure kernel upgrade, in accordance with an embodiment of the invention.

FIG. 7 is a flow diagram illustrating exemplary steps for mobile multimedia processor secure kernel upgrade, in accordance with an embodiment of the invention. Referring to FIGS. 2 and 7, at 702, the secure kernel 204 may present a signed DK2 for device authentication of the single mobile multimedia processor chip 202 by the upgrade server 203. The upgrade server 203 may utilize software running on a PC, for example, and may be coupled to the single mobile multimedia processor chip 202 via an Internet connection. At 704, the upgrade server 203 may authenticate the secure kernel 204 of the single mobile multimedia processor chip 202 using a user private key. The secure kernel 204 within the single mobile multimedia processor chip 202 may verify the upgrade server 203 using a user public key. At 706, the upgrade server 203 and the single mobile multimedia processor chip 202 may exchange a session key. At 708, the upgrade server 203 may communicate new software encrypted with the session key, to the single mobile multimedia processor chip 202. At 710, the secure kernel 204 may re-encrypt the secure kernel portion of the new software with a chip key. The newly encrypted secure kernel may then be stored on-chip or externally, on a disk.

Figure 8:
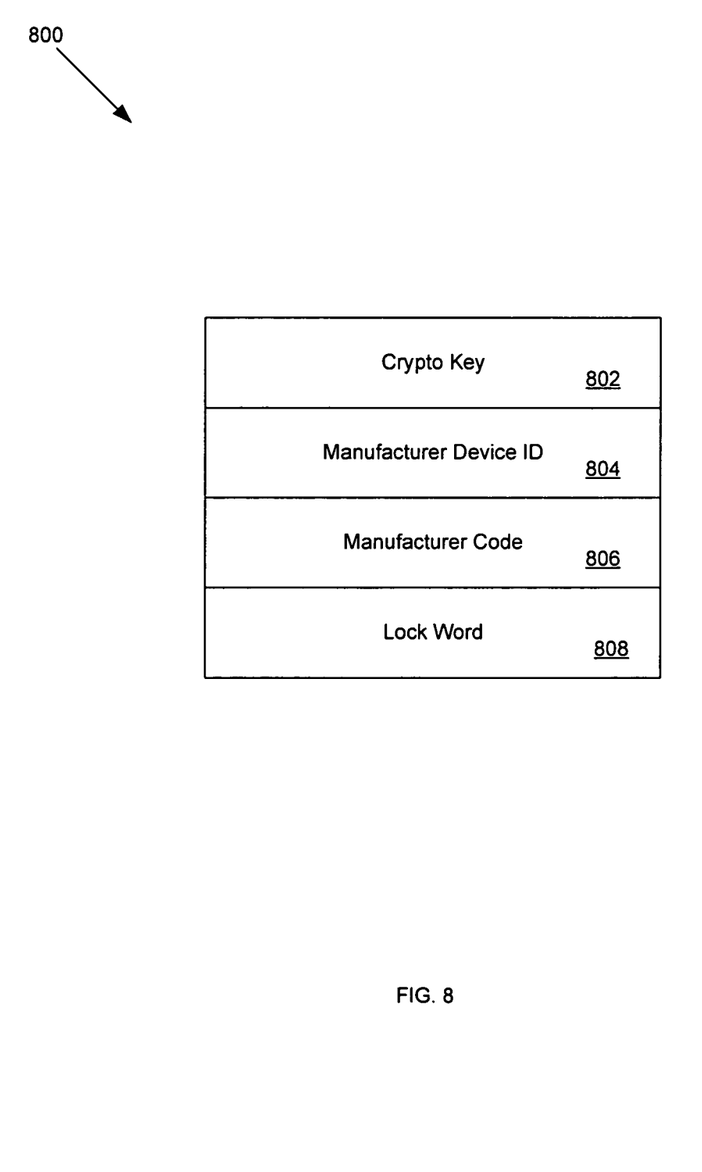
FIG. 8 is a block diagram of an exemplary layout of data within one-time programmable (OTP) memory, which may be utilized in accordance with an embodiment of the invention.

FIG. 8 is a block diagram of an exemplary layout of data within one-time programmable (OTP) memory, which may be utilized in accordance with an embodiment of the invention. Referring to FIG. 8, the OTP memory 800 within a single mobile multimedia processor chip may comprise a crypto key storage block 802, manufacturer device identification (ID) storage block 804, a manufacturer code storage block 806, and a lock word storage block 808. In one embodiment of the invention, a chip key storage block, such as the chip key storage block 210 within the single mobile multimedia processor chip 202 in FIG. 2, may be implemented as a part of the OTP memory 800. A one-time programmable (OTP) memory may comprise a memory that can be programmed to a specific value only once, and thereafter cannot be changed.

The crypto key storage block 802 may comprise suitable circuitry, logic, and/or code and may be adapted to store a crypto key, which may be accessible by the command decryption and may not be read from the single mobile multimedia processor chip. In one embodiment of the invention, the crypto key may comprise a 64-bit crypto key. The manufacturer device identification (ID) storage block 804 may comprise suitable circuitry, logic, and/or code and may be adapted to store a manufacturer device ID. The manufacturer device ID may be stored within the manufacturer device ID storage block 804 by the manufacturer and may be utilized during multimedia processing by the single mobile multimedia processor chip. In one embodiment of the invention, the manufacturer device ID may comprise a 32-bit manufacturer device ID.

The manufacturer code storage block 806 may comprise suitable circuitry, logic, and/or code and may be adapted to store a unique manufacturer ID, or manufacturer code, which may be set by the manufacturer of the single mobile multimedia processor chip. In one embodiment of the invention, the manufacturer code may comprise an 8-bit manufacturer code. The lock word storage block 808 may comprise suitable circuitry, logic, and/or code and may be adapted to store a lock word. If the lock word is set to a determined value, such as 0xA5A5A5, for example, no further changes within the OTP memory 800 may be performed. In an exemplary embodiment of the invention, the lock word may comprise a 24-bit lock word. Notwithstanding, the size of the lock word may be implementation depending.

Figure 9:
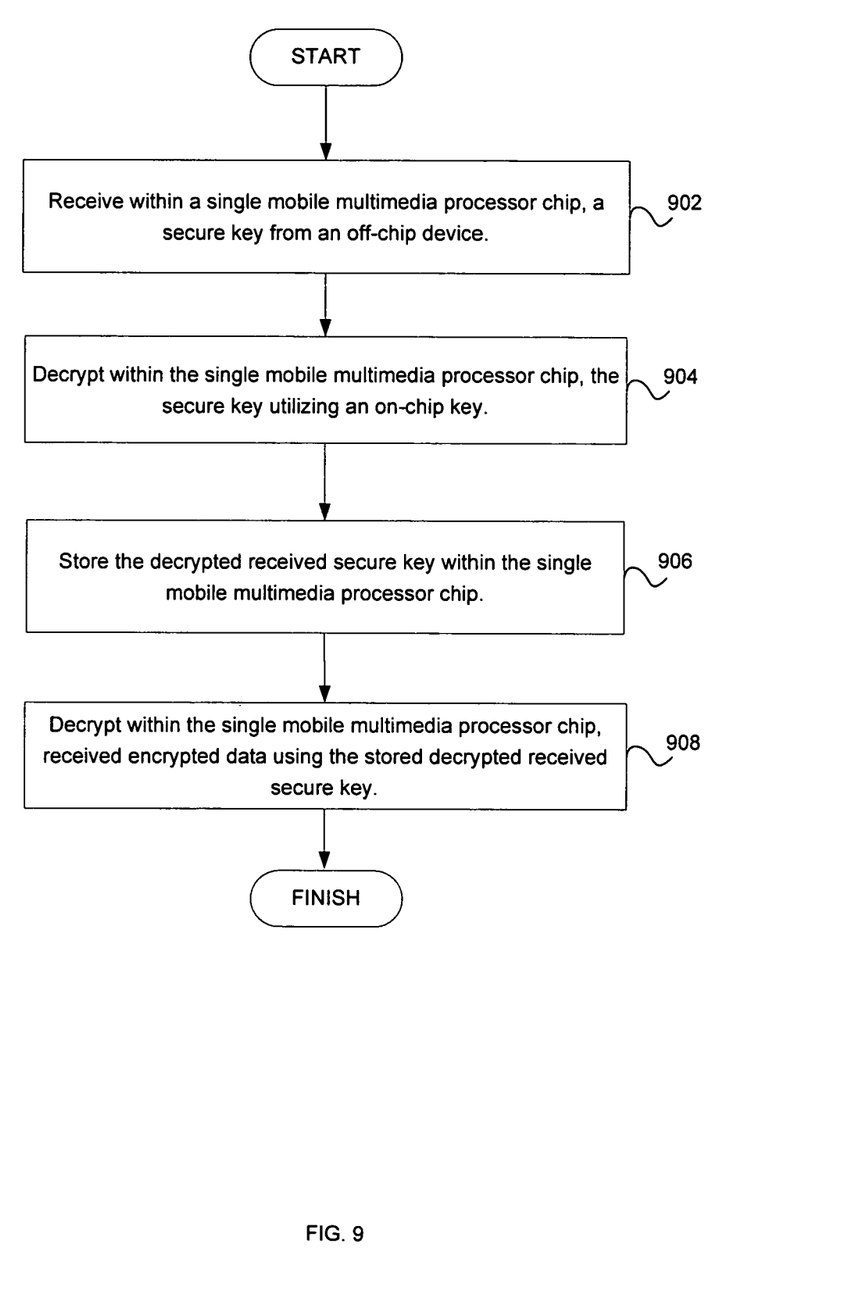
FIG. 9 is a flow diagram illustrating exemplary steps for processing data, in accordance with an embodiment of the invention.

FIG. 9 is a flow diagram illustrating exemplary steps for processing data, in accordance with an embodiment of the invention. Referring to FIGS. 2 and 9, at 902, a secure key 230 may be received by the single mobile multimedia processor chip 202 from the storage device 224. At 904, the received secure key 230 may be decrypted within the single mobile multimedia processor chip 202. For example, the key decryption block 214 may be adapted to decrypt the received secure key 230. At 906, the decrypted received secure key may be stored within the key storage block 218 within the single mobile multimedia processor chip 202. At 908, received encrypted multimedia content may be decrypted by the multimedia decryption block 212 within the single mobile multimedia processor chip 202 utilizing the decrypted received secure key stored within the key storage block 218.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing data, the method comprising:
receiving within a single mobile multimedia processor chip integrated within a mobile device, a secure key from an off-chip device integrated within said mobile device;
decrypting within said single mobile multimedia processor chip, said secure key utilizing an on-chip key;
storing said decrypted secure key within said single mobile multimedia processor chip;
decrypting within said single mobile multimedia processor chip, received encrypted data using said stored decrypted secure key; and
encrypting said stored decrypted secure key utilizing said on-chip key stored within said single mobile multimedia processor chip.

2. The method according to claim 1, wherein said on-chip key is stored within a one-time programmable (OTP) memory in said single mobile multimedia processor chip.

3. The method according to claim 2, further comprising retrieving said stored on-chip key from said OTP memory for said decrypting.

4. The method according to claim 1, further comprising storing said encrypted stored decrypted secure key in a memory outside said single mobile multimedia processor chip.

5. The method according to claim 1, wherein said received encrypted data comprises one or both of encrypted audio data and/or encrypted video data.

6. The method according to claim 1, further comprising decoding said decrypted received encrypted data within said single mobile multimedia processor chip.

7. The method according to claim 6, further comprising decoding said decrypted received encrypted data within a secure kernel in said single mobile multimedia processor chip.

8. The method according to claim 1, further comprising receiving said encrypted data within a secure kernel in said single mobile multimedia processor chip.

9. The method according to claim 8, further comprising encrypting at least a portion of said secure kernel within said single mobile multimedia processor chip utilizing said on-chip key.

10. A machine-readable storage having stored thereon, a computer program having at least one code section for processing data, the at least one code section being executable by a machine for causing the machine to perform steps comprising:
receiving within a single mobile multimedia processor chip integrated within a mobile device, a secure key from an off-chip device integrated within said mobile device;
decrypting within said single mobile multimedia processor chip, said secure key utilizing an on-chip key;
storing said decrypted secure key within said single mobile multimedia processor chip;
decrypting within said single mobile multimedia processor chip, received encrypted data using said stored decrypted secure key; and
encrypting said stored decrypted secure key utilizing said on-chip key stored within said single mobile multimedia processor chip.

11. The machine-readable storage according to claim 10, wherein said on-chip key is stored within a one-time programmable (OTP) memory in said single mobile multimedia processor chip.

12. The machine-readable storage according to claim 11, comprising code for retrieving said stored on-chip key from said OTP memory for said decrypting.

13. The machine-readable storage according to claim 10, comprising code for storing said encrypted stored decrypted secure key in a memory outside said single mobile multimedia processor chip.

14. The machine-readable storage according to claim 10, wherein said received encrypted data comprises one or both of encrypted audio data and encrypted video data.

15. The machine-readable storage according to claim 10, comprising code for decoding said decrypted received encrypted data within said single mobile multimedia processor chip.

16. The machine-readable storage according to claim 15, comprising code for decoding said decrypted received encrypted data within a secure kernel in said single mobile multimedia processor chip.

17. The machine-readable storage according to claim 10, comprising code for receiving said encrypted data within a secure kernel in said single mobile multimedia processor chip.

18. The machine-readable storage according to claim 17, comprising code for encrypting at least a portion of said secure kernel within said single mobile multimedia processor chip utilizing said on-chip key.

19. A system for processing data, the system comprising:
a single mobile multimedia processor chip integrated within a mobile device that enables receiving a secure key from an off-chip device integrated within said mobile device;
said single mobile multimedia processor chip enables decrypting said secure key utilizing an on-chip key;
said single mobile multimedia processor chip enables storing said decrypted secure key within said single mobile multimedia processor chip; and
said single mobile multimedia processor chip enables decrypting received encrypted data using said stored decrypted secure key; and
wherein said single mobile multimedia processor chip enables encrypting said stored decrypted secure key utilizing said on-chip key.

20. The system according to claim 19, wherein said single mobile multimedia processor chip comprises a one-time programmable (OTP) memory, and said on-chip key is stored within said one-time programmable (OTP) memory.

21. The system according to claim 20, wherein said single mobile multimedia processor chip enables retrieving said stored on-chip key from said OTP memory for said decryption.

22. The system according to claim 19, wherein said single mobile multimedia processor chip enables storing said encrypted stored decrypted secure key in a memory outside said single mobile multimedia processor chip.

23. The system according to claim 19, wherein said received encrypted data comprises one or both of encrypted audio data and/or encrypted video data.

24. The system according to claim 19, wherein said single mobile multimedia processor chip enables decoding said decrypted received encrypted data.

25. The system according to claim 24, wherein said single mobile multimedia processor chip enables decoding said decrypted received encrypted data within a secure kernel.

26. The system according to claim 19, wherein said single mobile multimedia processor chip enables receiving said encrypted data within a secure kernel.

27. The system according to claim 26, wherein said single mobile multimedia processor chip enables encrypting at least a portion of said secure kernel utilizing said on-chip key.

28. The method according to claim 1, wherein the secure key is an undivided secure key.

\* \* \* \* \*